United States Patent [19]

Kucera et al.

[11] Patent Number: 4,540,633

[45] Date of Patent: Sep. 10, 1985

[54] WATER DISPERSIBLE POLYURETHANE ADHESIVE COMPOSITIONS AND ADHESIVE LAYER FORMED THEREFROM

[75] Inventors: Helmut W. Kucera, West Springfield, Pa.; Samy K. Saad, Tonawanda, N.Y.

[73] Assignee: Textron, Inc., Providence, R.I.

[21] Appl. No.: 486,728

[22] Filed: Apr. 20, 1983

[51] Int. Cl.³ .............................................. B32B 27/40
[52] U.S. Cl. .............................. 428/423.1; 156/307.5; 156/331.4; 156/331.7; 427/208.4; 428/355; 524/501; 524/591; 524/839; 524/840
[58] Field of Search ............... 156/307.5, 331.4, 331.7; 427/208.4; 428/423.1, 355; 524/501, 839, 591, 840

[56] References Cited

U.S. PATENT DOCUMENTS

| | | |
|---|---|---|
| 3,479,310 | 11/1969 | Dieterich et al. . |
| 3,756,992 | 9/1973 | Dieterich et al. . |
| 3,796,678 | 3/1974 | Bartizal ................................. 524/591 |
| 4,039,517 | 8/1977 | Hamamura et al. ............. 156/331.7 |
| 4,061,618 | 12/1977 | Stanley et al. ....................... 524/591 |
| 4,160,065 | 7/1979 | Loewrigkeit et al. ............ 428/423.1 |
| 4,240,942 | 12/1980 | Wenzel et al. ...................... 524/591 |
| 4,301,053 | 11/1981 | Wolfrey ............................ 428/423.1 |

FOREIGN PATENT DOCUMENTS 1076688 12/1965 United Kingdom .
1158088 1/1968 United Kingdom .

Primary Examiner—John J. Gallagher
Attorney, Agent, or Firm—Michael L. Dunn; Howard M. Ellis

[57] ABSTRACT

A method for forming a urethane adhesive layer from an aqueous system by mixing a first component comprising a water dispersible oligourethane having a plurality of

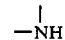

groups with an organic water dispersible second component to initially form a relatively low molecular weight composition tacky at a temperature below about 90° C. after removal of aqueous solvent followed by subsequent formation of a higher molecular weight composition, applying a layer of the resulting mixture to a substrate and removing the aqueous solvent from the layer to form an adhesive layer tacky at a temperature below 90° C. The invention also includes the adhesive layer and the method for adhering surfaces using such a layer.

9 Claims, No Drawings

WATER DISPERSIBLE POLYURETHANE ADHESIVE COMPOSITIONS AND ADHESIVE LAYER FORMED THEREFROM

BACKGROUND ART

This invention relates to the preparation and use of aqueous dispersions or solutions of isocyanate polyaddition products and to adhesive films formed from such products. The invention more particularly relates to amine-terminated, polyurethane oligomers containing hydrophilic groups which are self-dispersing or soluble in water and which when combined with water-soluble or dispersed epoxy resins or blocked isocyanates react to form high molecular weight or cross-linked compositions.

Aqueous dispersions or solutions of isocyanate polyaddition products have been known in the prior art (see, e.g. U.S. Pat. No. 4,240,942 to Wenzel et al.). Such compositions have been known which have an average molecular weight of less than about 15,000, which contain from about 0 to 120 milliequivalents, per 100 grams of solid content, of built-in ionic groups or from about 0 to 25 percent by weight based on total weight of the oligourethane of built-in ethylene oxide units and which further contain primary or secondary aminic amino end groups or semicarbazide end groups containing at least one

group. In addition, it is known that such oligourethanes can be reacted in aqueous phase with a chain-lengthening agent which is at least difunctional and which undergoes an addition reaction or condensation reaction with the amino end groups or semicarbazide end groups to effect chain lengthening of the oligourethanes.

It has further been known that polyurethanes, particularly solvent-based polyurethanes, could be used as adhesive compositions.

However, in the prior art it was not known how aqueous dispersions or solutions of oligourethanes, as previously described, could be used to form high quality adhesive films or layers. This was true because it was not recognized that prereaction in the aqueous system, as described in the prior art, destroyed adhesive qualities. In addition, such adhesive layers or films themselves were not previously known.

The formation of such layers or films from water dispersible or water-soluble oligourethanes is highly desirable to avoid solvent systems which are costly, often present a fire hazard and create pollution problems.

BRIEF DESCRIPTION OF THE INVENTION

In accordance with the present invention, there is provided a method for forming a urethane adhesive layer tacky at a temperature below about 90° C. which comprises mixing a first component comprising an oligourethane composition with a second component which can react with the first component. The first component comprises a polyurethane composition having an average molecular weight of less than about 15,000 and contains sufficient chemically bound hydrophilic groups selected from anionic groups, cationic groups, ethylene oxide residue and mixtures thereof to render the composition dispersible in an aqueous solvent. "Dispersible" as used herein is intended to mean stably dispersible in the form of a solution, colloid or emulsion. "Solvent" means the volatile liquid portion of the solution, colloid or emulsion. An aqueous solvent is a solvent which comprises at least 40 weight percent water. "Volatile" is intended to mean the tendency to rapidly vaporize at use temperature. Volatile solvents, e.g. water, usually have a vapor pressure greater than 15 mm of Hg at 20° C. and greater than 760 mm of Hg at 100° C.

The molecules of the polyurethane composition comprise a plurality of amino groups or semicarbazide groups which have at least one

group which are preferably terminal end groups.

The second component comprises an organic compound dispersible in an aqueous solvent, the molecules of the organic compound containing a plurality of groups capable of reacting selectively with the amino or semicarbazide groups, after mixing with the first composition in an aqueous solvent, to initially form a relatively low molecular weight composition tacky at a temperature of below about 90° C. upon rapid removal of the solvent after such mixing. Furthermore, the first and second components additionally react following formation of the low molecular weight tacky composition, to form a higher molecular weight or cross-linked composition. The method further includes the application of a layer of the mixture, prior to significant additional reaction, to a substrate and rapidly removing solvent from the layer to form an adhesive layer tacky at a temperature below about 90° C.

The invention further comprises the method for adhering two different surfaces which can be adhered by the adhesive layer formed in accordance with the above described method by forming the tacky adhesive layer upon at least one of the surfaces followed by placing the surfaces together and allowing the layer to cure to a higher molecular weight polyurethane composition as previously described. The invention also includes a urethane layer comprising an incompletely reacted mixture of a first component comprising an oligourethane composition with a second component which can react with the first component as previously described wherein the layer is tacky at a temperature below about 90° C. prior to complete curing of the layer. Furthermore, the invention includes a two-component adhesive system which comprises a first container holding a first component as previously described and a second container holding a second component as previously described. For purposes of forming the two-component system, the containers may be attached to each other.

DETAILED DESCRIPTION OF THE INVENTION

As previously discussed, one of the methods in accordance with the present invention is a method for forming a urethane adhesive layer tacky at a temperature below about 90° C. by mixing a first component comprising an oligourethane composition with a second component which can react with the first component. The mixing occurs in an aqueous solvent. The term "tacky" as used herein means the tendency to stick to a surface to be adhered by application of pressure. Methods for measurement of tack and for measurement of adhesive strength are given in ASTM standards, e.g. Tests D2979, D3121 and D897. For purposes of the present invention, the term "tack" includes an adhesive strength, prior to curing, which clearly requires some force to separate two surfaces. The uncured adhesive layer must be tacky at a temperature below about 90° C. and is preferably tacky at ambient temperature, i.e. 20° to 40° C.

"Polyurethane or urethane" as used herein is intended to mean polyurethane or urethane polymers as understood by those skilled in the art which are usually the reaction products of a polyisocyanate with polyesterpolyol or polyetherpolyol prepolymer. The polyurethane composition of the present invention is an oligourethane composition, i.e. a polyurethane composition of low molecular weight having an average molecular weight of less than about 15,000. The oligourethanes contain sufficient chemically bound hydrophilic groups selected from anionic groups, cationic groups, ethylene oxide residue and mixtures thereof to render the composition water dispersible. The oligourethanes preferably have an average molecular weight of from about 1000 to 10,000 and further preferably contain from about 0 to about 120 milliequivalents (usually from 0 to about 25 percent by weight), and preferably from about 0.5 to 50 milliequivalents (usually from 1 to 18 percent by weight), per 1000 grams of solids content, of built-in cationic or anionic groups or ethylene oxide units or mixtures thereof, based on the total weight of oligourethane.

In the preparation of the starting oligourethanes, the molecular weight can be easily adjusted in a known matter by suitable choice of the nature and quantitative proportions of the starting materials. Discussion is had of the types of starting materials and methods of manufacture in U.S. Pat. No. 4,240,942. Such starting materials include numerous multifunctional isocyanates, e.g. tetramethylene diisocyanate; hexamethylene diisocyanate; dodecamethylene diisocyanate; 1,4-diisocyanatecyclohexane; 1-isocyanato-3,3,5-trimethyl-isocyanatomethylcyclohexane; isophorone diisocyanate; 4,4'-diisocyanato-dicyclohexyl methane; 4,4'-diisocyanatodicyclohexyl propane-(2,2); 1,4-diisocyantobenzene; 2,4-diisocyanatotoluene; 2,6-diisocyanatotoluene; 4,4'-diisocyanato-diphenyl methane; 4,4'-diisocyanato-diphenyl propane-(2,2); p-xylyene-diisocyanate, a,a,a',a'-tetramethyl-m or -p-xylyene-diisocyanate, and mixtures thereof. Essentially any organic compound having at least two isocyanate reactive groups, in particular organic compounds with molecular weights of from about 60 to 10,000, preferably from about 500 to 6000 and most preferably from about 500 to 4000 may be used. Furthermore, in accordance with the present invention isocyanates having higher functionality, e.g. tri and tetra functional isocyanates, may be used.

The polyol with which the multifunctional isocyanate is reacted is preferably a hydroxy polyester, hydroxy polyether, hydroxy polythioether, hydroxy polyacetal, hydroxy polycarbonate, hydroxy polyesteramide or a mixture of such compounds. A detailed discussion of such suitable polyols is given in U.S. Pat. No. 4,240,942. Usually the most preferred polyols (hydroxyl compounds) are the hydroxy polyesters and the hydroxy polyethers. Low molecular weight carbon chain polyols may also be used as all or part of the polyhydroxy component, for example, ethanediol; 1,2-propanediol; 1,3-propanediol; 1,4-butanediol; 1,3-butanediol; pentanediols; hexanediols; trimethylolpropane; hexanetriols; glycerol and pentaerythritol. Diamines such as hexamethylenediamine or 1-amino-3,3,5-trimethyl-5-aminocyclohexane may also be used.

Further discussion of the polyisocyanate and hydroxyl compounds which may be used in the process according to the invention can be found, for example, in High Polymers, Vol. XVI "Polyurethanes, Chemistry and Technology" by Saunders and Frisch, Interscience Publishers, New York, London, Volume I, 1962 and Volume II, 1964.

The oligourethanes used in accordance with the present invention contain sufficient chemically bound hydrophilic groups selected from anionic groups, cationic groups and ethylene oxide residue and mixtures thereof to render the compositions water dispersible. The oligourethane (low molecular weight polyurethane composition) also comprises a plurality of amino groups or semicarbazide groups, which are preferably terminal or end groups, which have at least one

group. Such hydrophilically modified oligourethane prepolymers are prepared by methods well known to those skilled in the art. Such methods are, for example, described in German Offenlegungsschriften Nos. 1,495,745; 1,495,847; 2,446,440; and in U.S. Pat. Nos. 3,479,310 and 3,756,992 and in British Patent Nos. 1,158,088 and 1,076,688. The prepolymer may initially terminate in an oxazolidine ring which will liberate the free amine upon exposure to water.

The oligourethanes may contain only cationic hydrophilic groups, may comprise catonic hydrophilic groups in conjunction with other hydrophilic groups, or may comprise only hydrophilic groups other than cationic groups. Preferably the majority of the hydrophilic groups are cationic.

Examples of suitable cationic groups are the quaternary ammonium groups and sulphonium groups. Examples of especially suitable anionic groups are carboxy and sulfonic acid groups. In general, the oligourethane has an acid value of 0 to about 35 and an active hydrogen amine value of between 5 and 70.

In general, the ionic groups are included in the oligourethane by utilizing reactants in the preparation of the oligourethane which contain ionic or potential ionic groups (groups which can be converted into ionic groups by known methods), or which contain polyethylene oxide units. Such reactants are in general multifunctional isocyanates, polyamines or polyhydroxy compounds which are partially substituted for the isocyanates, polyols or amines previously mentioned for use in preparation of oligourethanes. Examples of reactants which contain ionic, potentially ionic or polyethylene oxide units are: N-alkyl-dialkanolamines such as N-methyl-diethanolamine, N-ethyl-diethanolamine, N-propyl-dipropanolamine; diamino acids and acid salts such as N-(2-aminoethyl)-2-aminoethane sulphonic acid, dimethylol propionic acid and their salts; and sulphonate diols.

In accordance with the present invention, the oligourethane composition is mixed with a second component comprising a water dispersible organic compound which may be in an aqueous solvent. The molecules of the organic compound contain a plurality of groups capable of reacting selectively with the amino or semicarbazide groups of the oligourethane. Such reaction occurs after mixing of the second component with the first component containing the oligourethane in an aqueous solvent. Initially, the reaction forms a relatively low molecular weight composition tacky at a temperature of below about 90° C. upon removal of the solvent after the mixing.

The mixing occurs in a solvent which is usually an aqueous solvent. The solvent may comprise the original aqueous solvent containing the organic compound, may comprise aqueous solvent containing the oligourethane and may comprise additional aqueous solvent added to the mixture. The aqueous solvent may contain a co-solvent or coupling solvent to assist in solution formation. Such co-solvents may, for example, be the cellosolves, e.g. monomethyl to monobutyl glycol ethers and methyl cellosolve acetate; the carbitols, e.g. monomethyl to monobutyl diethylene glycol ethers and carbitol acetate; the alcohols, e.g. methyl, ethyl, isopropyl, diacetone, and hexanetriol; the glycols, e.g. ethylene, propylene, hexylene, diethylene, triethylene and dipropylene glycols; certain esters, e.g. methyl acetate, ethyl acetate, ethyl lactate, diethyl phosphate, methoxy triglycol acetate and ethylene carbonate; certain ethers such as dioxane, 3-methoxy butanol, 1,2,6-ethyoxy triglycol and tetrahydropyran 2-methanol; certain mercaptans such as mercapto-ethanol and thioglycol; polyethoxylated compounds such as substituted phenols and certain rosins; formamides such as dimethyl formamide and ketones such as acetone and methylethyl ketone. Such co-solvents, when present, are usually present in an amount of from 0 to 30 percent by weight of the water in the finished mixture prior to removal of the solvent. Usually such co-solvents are present in an amount of less than about 8 percent by weight of total mixture and usually less than about 10 percent by weight of water in the solvent.

Optionally, the solvent may contain from 0 to 10 percent by weight of surface active agent. Usually such surface active agents are not used since they are generally not required and tend to increase water sensitivity of the cured adhesive.

The aqueous solvent usually comprises from about 60 to about 85 percent by weight of the finished product prior to application to form an adhesive layer.

In general, the organic compound containing a plurality of groups capable of reacting selectively with the amino or semicarbazide groups, also referred to herein as a chain-lengthening agent, is any, preferably difunctional, organic compound which undergoes an addition or condensation reaction with the amine or semicarbazide groups of the oligourethane. Suitable chain-lengthening agents therefore include bis-epoxides such as the reaction product of bisphenol A with two moles of epichlorohydrin or higher molecular weight bis-epoxides with molecular weights of up to about 3000 or hydrophobic diisocyanates which are often blocked by known methods. Suitable diisocyanates are those diisocyanates previously described.

The following chain-lengthening agents are particularly preferred: hexamethylene diisocyanate; 1-isocyanato-3,3-5-trimethyl-5-isocyanatomethyl-cyclohexane; 2,4-diisocyanatotoluene; 2,6-diisocyanatotoluene; 4,4'-diisocyanato-diphenyl methane and any mixtures of these diisocyanates.

After the first component is mixed with the second component, a layer of the mixture is applied to a substrate before the components can react to an extent of more than 50 percent. The application preferably occurs before reaction occurs to the extent of 20 percent.

After application, the aqueous solvent is removed from the layer to form a tacky adhesive layer prior to reaction of the components together to an extent of more than 50 percent and preferably before reaction to an extent of more than 20 percent. Such removal occurs sufficiently soon to form an adhesive layer tacky at a temperature below about 90° C., i.e. "rapid removal". The removal of the water may occur either at ambient conditions or may occur at an elevated temperature.

It is to be particularly noted that application of such a mixture prior to reaction of the components to an extent of more than 50 percent and preferably prior to reaction of the components to the extent of more than 20 percent and rapidly removing the aqueous solvent before reaction to the extent of more than 50 percent and preferably before reaction to the extent of more than 20 percent results in an adhesive layer tacky at a temperature below about 90° C. which was previously not possible in the prior art. It was not previously recognized that the rapid application of the mixture prior to reaction, as previously discussed, would result in a superior adhesive. In general, the aqueous solvent is removed within about 1 week and preferably within about 8 hours of the time that the first component is mixed with the second component and is usually removed within about 1 hour and preferably within about 30 minutes of the time that removal is commenced or from the time that a layer of the mixture is applied to a substrate. This application and removal of solvent before formation of a high molecular weight product has the further unexpected result that trifunctional components can be used in the dispersion which results in a cross-linked adhesive having good strength and chemical resistance without causing the dispersion to gel prior to use.

The invention further includes the method for adhering two different surfaces which can be adhered by the adhesive layer formed in accordance with the method as previously described. The method for adhering the two different surfaces comprises applying the adhesive layer to at least one of the surfaces followed by placing the surfaces together under pressure and heat if required, and allowing the layer to cure to a higher molecular weight polyurethane composition. When the layer is first applied, the product is a low molecular weight product of usually less than about 30,000 i.e. relatively low molecular weight, at less than 50 percent precure prior to application of the layer and removal of the aqueous solvent and is preferably less than about 20,000 at less than about 20 percent precure of the mixture prior to removal of the aqueous solvent. After curing, the molecular weight is usually in excess of 50,000 i.e. relatively high molecular weight.

In addition, the invention includes a urethane layer comprising an incompletely reacted mixture of a first and second component as previously described and includes a two-component adhesive system which comprises a first container holding a first component as previously described and a second container holding a second component as previously described such that when the first component is mixed with the second component a relatively low molecular weight composition in an aqueous solvent will be initially formed which is tacky at a temperature below about 90° C. upon rapid removal of the aqueous solvent after such mixing followed by subsequent formation of a higher molecular weight composition. The containers may be of any size and when packaged together are usually from a few ounces to over 50 gallons.

The following examples serve to illustrate and to not limit the present invention:

EXAMPLE I

Polyester Based Oligourethane

Into a flask equipped with an agitator, thermometer and nitrogen inlet tube were placed 66.5 parts of dimethylolpropionic acid, 66.5 parts of dry methylethyl ketone, 993.3 parts of hydroxyl functional neopentyl glycol hexanediol adipate (molecular weight 2036) and 105.8 parts of hydroxyl functional neopentylglycol hexanediol adipate (molecular weight 528). Then while stirring in an inert atmosphere, the mixture was heated at 85° C. for one hour to affect solution. After cooling to room temperature, 334.5 parts of toluene diisocyanate were added all at once. The temperature was then raised to 85° C. and held there for four hours until the NCO content reached 3.8% (96% of theory). At this point the prepolymer exhibited a non-volatile content of 95.6%, a viscosity of 2860 poises @25° C., and an acid value of 18.9.

To 1520 parts of the above prepolymer at 25° C. were added 112.7 parts of methylethyl ketoxime with gentle heating. After about one-half hour, the mixture was 60° C. and then 117.8 parts of aminoethylethanolamine in 449 parts of water were added followed immediately by addition of another 1800 parts of water. The resulting emulsion was heated to 70° C. and held at 70° C. for three hours. At the end of this time, the resulting oligourethane product exhibited a non-volatile content of 36.47%, a viscosity of 63.2 poise at 25° C., an amine value of 16.0 and a pH of 9.49. In addition, it had a milky white appearance. Upon dilution with water to 33.96% the oligourethane exhibited a viscosity of 0.1 poise at 25° C., an amine value of 15.2 and a pH of 9.62

Thirteen parts of diglycidyl ether bisphenol A epoxy resin having a molecular weight of about 400, were than dispersed into 100 parts of the above oligourethane product, followed by dilution with water to a viscosity suitable for adhesive application. The diluted product had a viscosity of 10 cps, a solids content of 25%, no flash point and a pot life of over 24 hours (time to reach 20% reaction).

The diluted product was then applied well before expiration of the pot life to 75 gauge polyethylene terephthalate polyester film using a #6 meyer rod applicator. Coating weights were typically 2 lbs./ream. A heat gun was used to dry the adhesive (approximately 30 seconds at 65°–82° C.). A second film (low-density polyethylene, corona treated, Deerfield 915.14) was laminated to the first one, then passed through a laminator with a nip temperature of about 70° C. and about 5.6 kilograms per square centimeter laminating pressure.

Bond strength was measured in a peel mode on an Instron at speeds of 12 inches per minute after lamination and at various intervals thereafter. The results are set forth in Table 1.

TABLE 1

| Time | Bond strength (g/in.) |
|---|---|
| Initial | 295 |

TABLE 1-continued

| Time | Bond strength (g/in.) |
|---|---|
| after 2 hr RT* | 450 |
| 24 hr RT | 630 FT** |
| 24 hrs 160° F. | 590 FT |
| 1 week RT | FT** |

These data indicate that the adhesive has good initial bond strength and this builds rapidly at room temperature to provide destructible bonds.

This construction was also aged 24 hrs at 160° F. to develop full bond strength and then immersed in boiling water for 20 min.

No tunneling or delamination was observed. These are performance standards believed in effect for "boil-in-bag" food pouches.

The basic bond development profile was measured for other common film combinations. The results are shown in Table 2.

TABLE 2

| | Bond Strength (g/in.) | | | |
|---|---|---|---|---|
| | Bond Age | | | |
| Film Structure | Initial | 2 hrs/RT | 24 hrs RT | 1 wk RT |
| LDPE/PET | 290 | 500 | 500 | FT** |
| LDPE/Nylon | 295 | 340 | 410 | FT |
| LDPE/M PET | 250 | 320 | 360 | FT |
| LDPE/Al foil | 570 | 520 | 700 | FT |
| PET/Al foil | 140 | 275 | 365 | FT |

*RT is room temperature.
**FT indicates film tear or failure of the substrates. This is the maximum bond strength attainable with these substrates.
LDPE Low density polyethylene 915.14 Deerfield
PET LBT Mylar (75 gauge)
MPET metalized Mylar
Nylon Nylon 77K from Allied Corporation
Al foil Medium weight aluminum foil

EXAMPLE II

Polyether-Based Oligourethane

Into a flask equipped with an agitator, thermometer and nitrogen inlet tube were placed 496.7 parts of an ethylene oxide capped polypropylene glycol (typified by Olin Corporation Poly G55-56) having a molecular weight of 2000, 496.7 parts of polypropylene glycol (molecular weight 2000), 105.8 parts of polypropylene glycol (molecular weight 425) and 66.5 parts of dimethylolpropionic acid. Then while stirring, in an inert atmosphere, the mixture was heated at 80° C. for one hour to affect solution, cooled to room temperature and combined with 334.5 parts of toluene diisocyanate. The temperature was then raised to 85° C. and held there until an NCO content of 4.1% was reached. At that time, the oligourethane prepolymer was cooled slightly and 375 parts of methylethyl ketone were added. At the end of this time, the prepolymer solution exhibited a solids content of 80.3%, a viscosity of 5.5 stokes at 25° C., an acid value of 14.83 and an NCO content of 3.12%.

A total of 1600 parts of the above prepolymer were added slowly over a period of three hours and twenty-five minutes to a solution of 123.8 parts of aminoethylethanolamine in 2878 parts of water while under strong agitation. The resulting oligomethane product exhibited a solids content of 30.42%, a viscosity of 63.9 stokes at 25° C., a pH of 9.25 and an amine value of 13.22. The product was a clear colloid.

To make the final adhesive, 13 parts of diglycidyl ether bisphenol A epoxy resin, having a molecular weight of about 400, were added to 100 parts of the above polyether based oligourethane just prior to use. These components were mixed for 15 minutes to disperse the epoxy and the product was diluted to application viscosity with water.

The product had a solids content of about 25%, a viscosity of about 25 cps, a milk colloid appearance, a flash point of about 29° C. and a pot life in excess of 24 hours.

The diluted product was then applied to a 75 gauge polyethylene terephthalate polyester film as described in Example I. and a second polyethylene film was laminated to the polyester film and tested as described in Example I. The results are set forth in Table 3.

TABLE 3

| Time | Bond Strength (g/in.) |
|---|---|
| Initial | 290–320 |
| 2 hrs @ RT | 800 FT* |
| 24 hrs @ RT | 770 FT* |
| 1 wk @ RT | FT |
| 24 hrs @ 160° F. | FT |

This construction, oven aged at 160° F. for 24 hours to develop full bond strength, was then immersed for 20 minutes in boiling water. No delamination or tunnelling occurred. This is believed to meet industry "boil-in-bag" standards.

The basic bond profile was also developed for other film combinations. The results are shown in Table 4.

TABLE 4

| | Bond Strength (g/in.) | | |
|---|---|---|---|
| | Bond Age | | |
| Film Structure* | Initial | 2 hrs/RT | 1 wk RT |
| LDPE/PET | 320 | 520 | FT |
| LDPE/Nylon 77K | 295 | 340 | FT |
| LDPE/MPET | 250 | 320 | 410 |
| OPP/PET | 68 | 115 | FT |
| LDPE/Al Foil | 545 | 545 | FT |
| PET/Al Foil | 450 | 450 | 450 |

This performance is consistent with existing solvent-based adhesive technology.
*See previous description of film types in Example 1.
OPP is oriented polypropylene from Hercules
FT is film tear, or maximum bond strength attainable
Bond values are measured in grams per inch at peel speed of 12"/min.

What is claimed is:

1. A layer from which water has been removed comprising an incompletely reacted mixture of a first component comprising an oligourethane composition with a second component which can react with the first component; said first component comprising an oligourethane, said oligourethane comprising a polyurethane composition having an average molecular weight of less than about 15,000 and containing sufficient chemically bound hydrophilic groups selected from anionic groups, cationic groups, ethylene oxide residue and mixtures thereof to render the composition water dispersible, the molecules of said polyurethane composition comprising a plurality of amino groups or semicarbazide groups which have at least one

group; and said second component comprising an organic compound dispersible in an aqueous solvent, the molecules of said organic compound containing a plurality of groups capable of reacting selectively with the amino or semicarbazide groups within the layer, said layer being tacky at a temperature below about 90° C.

2. The layer of claim 1 wherein the oligourethane comprises cationic hydrophilic groups and the

groups are terminal

groups.

3. The layer of claim 1 wherein the oligourethane comprises both cationic and anionic hydrophilic groups.

4. The layer of claim 1 wherein said organic compound in said second composition comprises a component selected from the group consisting of bis-epoxide, multifunctional epoxide and blocked multifunctional isocyanate.

5. The layer of claim 4 wherein the oligourethane is a polyester based polyurethane or a polyether based polyurethane.

6. The layer of claim 4 wherein the organic compound is a bis-epoxide.

7. The layer of claim 4 wherein the oligourethane has an acid value of from 0 to 35 and an active hydrogen amine value of between 5 and 70.

8. The layer of claim 4 wherein the layer is formed and aqueous solvent is removed within about 1 week of the time that the first component is mixed with the second component and within about 60 minutes of the time that removal is commenced to form a layer wherein less than 20 percent of said second component is reacted with said first component.

9. The layer of claim 1 wherein the layer is tacky at ambient temperature.

* * * * *